Jan. 24, 1967     R. H. O'KANE     3,300,165
TRIPOD
Filed July 27, 1965     2 Sheets-Sheet 1
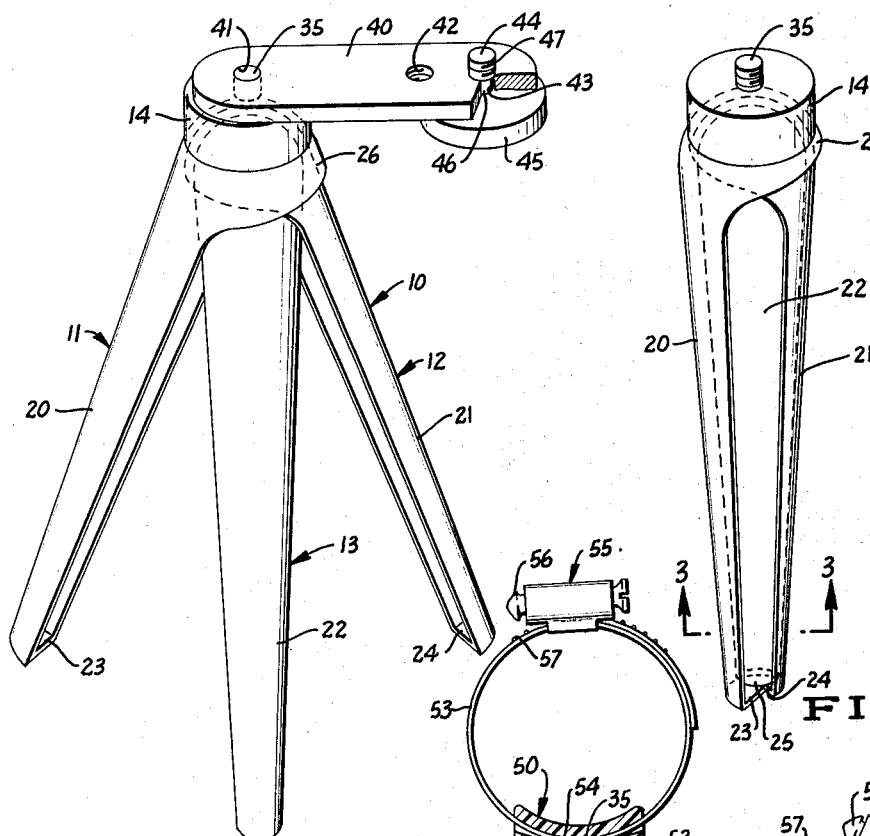
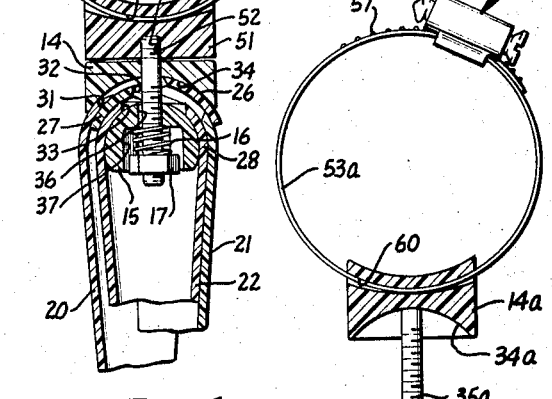
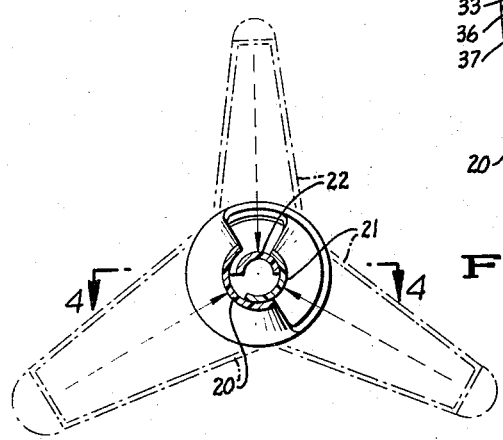
INVENTOR.
RICHARD H. O'KANE
BY Naylor + Neal
ATTORNEYS Jan. 24, 1967  R. H. O'KANE  3,300,165
TRIPOD
Filed July 27, 1965  2 Sheets-Sheet 2

INVENTOR.
RICHARD H. O'KANE
BY Naylor + Neal
ATTORNEYS

United States Patent Office 3,300,165
Patented Jan. 24, 1967

3,300,165
TRIPOD
Richard H. O'Kane, 16045 Highway 128,
Calistoga, Calif. 94515
Filed July 27, 1965, Ser. No. 475,149
15 Claims. (Cl. 248—168)

This application is a continuation-in-part of my copending application Serial No. 401,015, filed October 2, 1964, now abandoned.

The present invention relates to a collapsible tripod adapted to support cameras, telescopes, surveying instruments and the like; and is particularly directed to such a tripod of simplified construction and operation. The invention is especially directed to a tripod incorporating a table and legs which are mounted relative to each other for universal movement through the utilization of a minimum of parts.

In the prior art, tripods incorporating various leg and pedestal structures have been provided. Of these tripods, those with collapsible legs may be divided into general categories, namely, the type having radially swingable legs and the type having annularly swingable legs. Naturally, both of these types may also be provided with longitudinally extensible legs cooperating with the swingable leg portions. Regardless of the type of leg structure provided, however, all prior art tripods provided with universally mounted tables have the common disadvantage that the mounting for the table is relatively complex both with respect to its structure and operation. This complexity in structure is one of the prime reasons for the relatively high cost of tripods on the market today.

It is, accordingly, a principal object of this invention to provide a tripod which avoids the complexity of prior art tripods and the disadvantages which result therefrom. Another object of the invention is to provide a collapsible tripod of simplified construction which has substantially the same versatility as more complex prior art devices.

Yet another object of the invention is to provide a simplified collapsible tripod and universally mounted table combination incorporating fewer elements than prior art devices, all of which elements may be manufactured at a minimum of expense. With respect to this object, it is another object of the invention to provide such a tripod ideally suited for fabrication from plastic materials, such as the polycarbons.

A further object of the invention is to provide a tripod and universally mounted table combination which utilizes the strength of the elements incorporated thereinto to optimum advantage, thus resulting in a device having an improved strength-to-weight ratio as compared to prior art devices.

Still another object of the invention is to provide a tripod having legs so shaped that when folded they comprise a substantially smooth surface, which surface forms an ideal grip for an article, such as a camera, supported on the tripod and alleviates the need for a tripod carrying case.

Another object of the invention is to provide a tripod readily adaptable for the support of alternative articles. With respect to this object, it is a more specific object of the invention to provide a table structure having self-contained gripping means and balancing means.

Yet another object of the invention is to provide a tripod having radially swingable legs which may be readily collapsed simply by forcing the legs toward each other.

Broadly, the tripod of the present invention comprises: three legs which are joined together for universal movement with respect to each other by overlapping frusto-spherical surfaces formed thereon; a table received on the uppermost of the surfaces for universal sliding movement with respect thereto, and a retainer assembly cooperating with the table to maintain said table and legs in predetermined orientation with respect to each other. The retainer assembly simply comprises a member mating with the exterior of the frusto-spherical surface of the lowermost leg for universal movement with respect thereto and means adapted to pull the table and member toward each other to clamp the overlapping surfaces of the legs therebetween.

The detailed construction of the invention and the foregoing and other objects will become more apparent when viewed in light of the following description and accompanying drawings, wherein:

FIG. 1 is a perspective view illustrating one embodiment of the inventive tripod in extended condition;

FIG. 2 is a perspective view of FIG. 1, the tripod in collapsed condition;

FIG. 3 is a sectional view taken on plane 3—3 of FIG. 2, with the phantom lines therein showing the manner in which the legs are extended from the collapsed condition;

FIG. 4 is a sectional view, with part thereof broken away and a clamping band added, taken on plane 4—4 of FIG. 3, and FIG. 5 is an elevational view, partially in section, illustrating an alternative form of table adapted to be used on the tripod of FIGS. 1 to 3.

Figure 6:
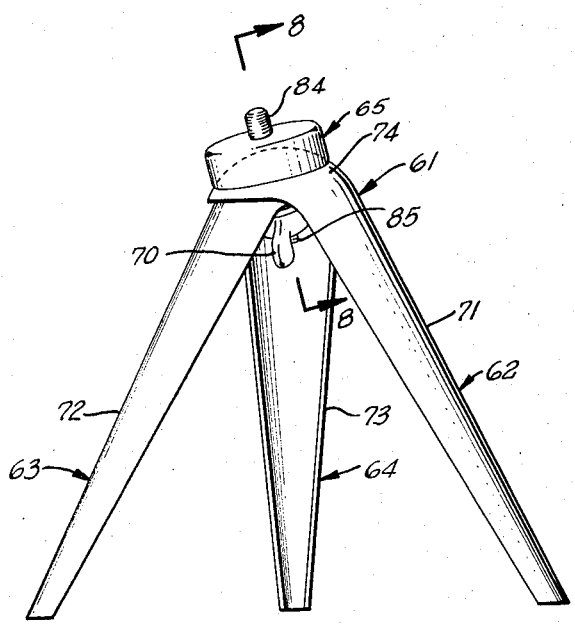
FIG. 6 is a perspective view of an alternative embodiment of the inventive tripod in extended condition.

Referring now to the drawings in detail, the numeral 10 therein designates one embodiment of the inventive tripod in its entirety. The tripod 10 simply comprises legs 11, 12 and 13; a table or pedestal 14; a retainer member 15; a coil spring 16, and a nut 17. Thus, at the outset, it can be seen that the combined structure of the FIG. 1 embodiment of the invention incorporates far fewer elements than are generally found in prior art tripod and pedestal combinations.

The legs 11, 12 and 13 include support sections 20, 21 and 22, respectively, each of which defines a longitudinal segment of a hollow cone. These sections differ from each other only in that the length and radii of the lower sections 21 and 22 are less than that of the upper section 20 by a dimension equal to the thickness of the sections thereabove. In the preferred embodiment illustrated, the sections 20, 21 and 22 are each provided with foot portions 23, 24 and 25, respectively. These portions are intended primarily to reinforce the leg structure and close the end surface presented thereby when the tripod is in the collapsed condition, as seen in FIG. 2.

The sections 20, 21 and 22 have formed on the upper ends thereof frusto-spherical dish-shaped elements 26, 27 and 28, respectively, which elements seat in overlapping mated relationship, as can be best seen from FIG. 4. From the latter figure, it can be seen that the frusto-spherical segments defining the elements 26, 27 and 28 are so proportioned relative to each other as to be concentric. The structure of the elements 26, 27 and 28 is completed by openings 31, 32 and 33, respectively, formed therethrough, which openings are preferably circular and of essentially the same diameter.

In the assembled condition, the table 14 assumes a position universally mounted on the upper surface of the element 26 wherein it functions is cooperation with the retainer member 15 to hold the elements 26, 27 and 28 in seated engagement. Universal movement of the table 14 is facilitated by a frusto-spherical surface 34 formed thereon and adapted to mate slidably with the upper surface of the element 26. The table 14 has extending therethrough a stud 35, which stud extends both above and below the table. The upper end of the stud 35 is provided to mount articles, such as cameras, on the table. The lower end of the stud 35, as can be best seen from FIG. 4, extends through the elements 26, 27 and 28; the retainer member 15, and spring 16, and into threaded engagement with the nut 17. Thus, the stud 35, together with the spring 16 and nut 17, functions to resiliently bias the retainer member 15 against the lower surface of the element 28. The spring 16 is so characterized that it functions to bias the retainer member 15 against the lower surface of the element 28 to impart a frictional resistance force between said surface and member exceeding the frictional force resisting turning of the stud 35 in the nut 17. The stud 35 is fixed to the table 14.

Passage of the stud 35 through the elements 26, 27 and 28 is provided by the openings 31, 32 and 33, respectively, formed in these elements. These openings are preferably round and of sufficient diameter relative to the stud 35 as to avoid interference therewith when the legs 11, 12 and 13 are swung radially between the extended and retracted positions illustrated in FIGS. 1 and 2, respectively. As can best be seen from FIG. 3, the swinging of the legs between the latter positions is adapted to take place radially about the center of the concentric frusto-spherical dish-shaped elements 26, 27 and 28. The extreme retracted position of the legs is limited by abutment therebetween, as shown by the juxtaposed position assumed by the legs in FIGS. 2, 3 and 4. The extreme extended position of each of the legs is limited by abutment of the leg section thereof with the boundary defining edge portions of the dish-shaped elements disposed in juxtaposition to the dish-shaped element fixed thereto. This relationship can best be appreciated by observation of the dish-shaped elements and the leg sections connected thereto when viewed in the mated concentric condition illustrated in FIG. 1. For example, from this figure it can be seen that when the leg sections 20 and 21 are swung radially relative to each other, the section 21 reaches a point wherein it abuts the boundary defining edge of the element 26.

Passage of the stud 35 through the retainer member 15 is provided by communicating openings 36 and 37 extending through the member. From FIG. 4 it can be seen that the opening 36 is sufficiently large to loosely receive the stud 35 and that the opening 37 is of hexagonal cross-section and adapted to confine the nut 17 against rotational movement with respect to member 15. In the assembled condition, the spring 16 is received within the opening 37 and the nut 17 is confined within the opening for rectilinear movement with respect thereto. Through provision of this rectilinear movement, the nut 17 may be selectively tightened or loosened on the stud 35 by simply rotating the table 14 about the axis of the stud 35. The latter function is facilitated by the aforedescribed frictional resistance force imparted between the retainer member 15 and element 28 by the spring 16.

Referring now to the upper portion of FIG. 1, therein is shown a balancing arm 40 secured to and extending laterally from the table 14. The arm 40 has extending therethrough at spaced locations threaded openings 41, 42 and 43. In the condition illustrated, the opening 41 is threadably received on the stud 35 to secure the arm in place and the opening 43 has extending therethrough an article attaching stud 44. The latter stud includes a lower knob portion 45, an intermediate unthreaded portion 46 and an upper threaded portion 47. Through the latter construction, once the stud 44 is threaded through the opening 43, it is free to be turned by the knob portion 45 and threaded into an article desired to be supported.

The purpose of the arm 40 is to adapt the tripod 10 for the support of articles, such as cameras, having threaded tripod sockets spaced from their center of gravity. This is accomplished by first attaching the arm to the tripod through means of the opening 41 and then centering the article to be supported above the tripod. After centering the article, the stud 44 is threaded through a select one of the openings 42 or 43 and into the tripod socket of the article. It is to be understood that the opening 42 or 43 which is selected will be determined by the position of the tripod socket on the article and that the arm may be provided with any number of variously located openings corresponding to the openings 42 and 43. In the commercial embodiment of the invention, it is anticipated that openings, such as the openings 42 and 43, would be provided to accommodate two or more popular camera models.

Referring now to the upper portion of FIG. 4, therein is illustrated a converter 50 designed to adapt the tripod 10 for use in the support of articles which are not provided with threaded tripod receiving sockets. These articles might typically take the form of spotting or surveyor's scopes. The converter 50 comprises: a block 51 having an internally threaded opening 52 therein adapted to be threadedly received on the stud 35, and a band 53 extending through a slot 54 provided therefor in the block 51. The band 53 is of the "radiator hose clamp type" and is provided with overlapping end portions adapted to be selectively forced toward or away from each other by a screw tightener 55. The screw tightener comprises a screw 56 rotatably mounted on one end of the band and transverse ribs 57 formed on the other end of the band and engageable with the screw. Through this arrangement, the band 53 may be selectively extended and tightened around an article, thus securely fastening the article to the block 51. The block 51 is fastened to the tripod 10 simply by threading the opening 52 onto the upper end of the stud 35.

FIG. 5 illustrates a table 14a adapted to be used on the tripod 10 in place of the table 14. The table 14a includes an undersurface 34a and stud 35a corresponding in structure and function to the surface 34 and stud 35 of the table 14. The upper portion of the table 14a corresponds substantially to that of the converter 50 and includes a slot 60 extending therethrough adapted to receive a band 53a of the "radiator hose clamp type" corresponding to the band 53 in structure and function. For the sake of simplicity, like parts on the bands 53 and 53a are designated by corresponding numerals.

The table 14a may be readily substituted for the table 14 without the necessity of changing the tripod leg and retention structure. Thus, it is possible to readily adapt the tripod 10 to incorporate either the table 14 or 14a. The particular table employed on the tripod will, naturally, be determined by the use for which the tripod is intended.

When the tripod 10 is in the assembled condition, the legs 11, 12 and 13 may be moved between the extended and collapsed positions simply by forcing the legs inwardly as described previously with respect to FIG. 3. In the case where the tripod is relatively small, the user may accomplish this collapsing simply by closing his hand around the top of the legs and moving it down their length. To extend the legs from the collapsed position, the reverse of the collapsing operation is accomplished simply by pulling the legs outwardly, thus swinging them radially about the center of the elements 26, 27 and 28. To facilitate ease of the leg movement, the table 14a may be turned to loosen the nut 17. Once the legs and table 14 have been moved to the desired position, the pressure maintaining this position may be increased simply by turning the table 14 relative to the legs to tighten the nut 17. It is noted that at all times the spring 16 functions to maintain pressure on the retainer member 15. The provision of this pressure has the advantage that it facilitates controlled adjustment of the table and the legs in that it resists rotational movement of the retainer member 15 upon turning of the stud 35.

Although it is preferred to extend and retract the tripod in the manner described above, it is to be understood that the legs 11, 12 and 13 may be swung in a circular path into collapsed condition. The preferred technique, however, is advantageous in that it is simpler to effect and results in collapsing of the tripod to the closed condition illustrated in FIG. 2. As noted above, this condition is desirable since it presents a substantially smooth exterior surface ideally suited for storage and for utilization as a handle on the article to which the tripod is attached.

Figure 7:
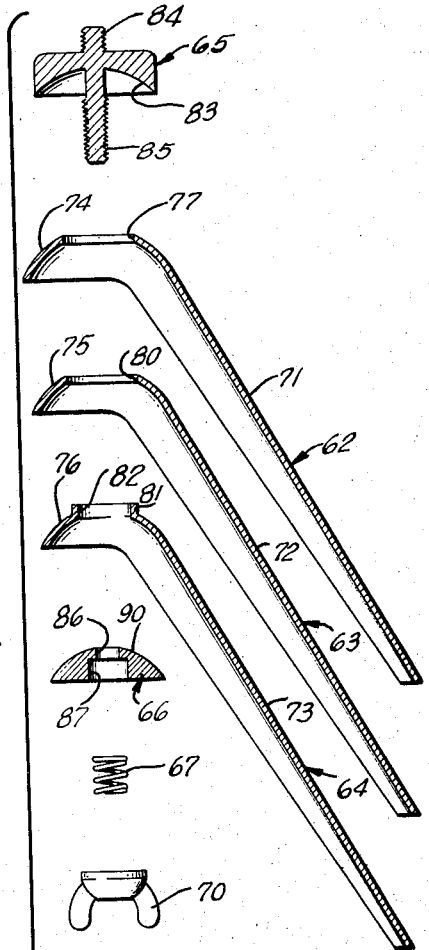
FIG. 7 is an exploded view, partially in section, illustrating the FIG. 6 tripod in collapsed condition; and, FIG. 8 is a sectional view taken on plane 8—8 of FIG. 6.
Figure 8:
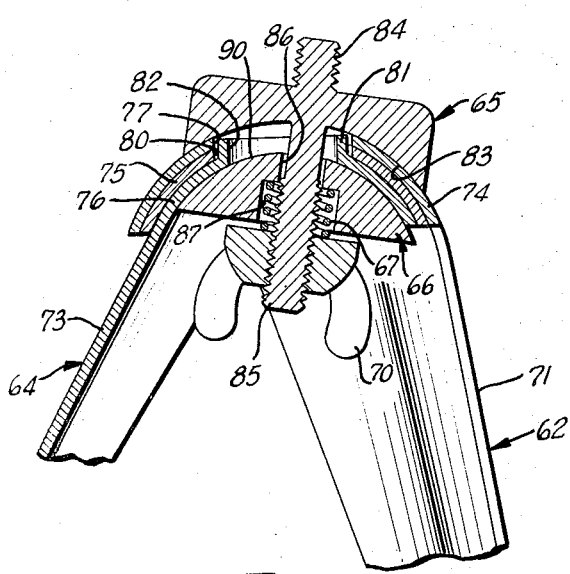

Referring now to the embodiment of the invention illustrated in FIGS. 6 to 8, the numeral 61 therein designates the inventive tripod in its entirety. The tripod, as can be clearly seen from FIG. 7, simply comprises legs 62, 63 and 64; a table or pedestal 65; a retainer member 66; a coil spring 67; and a wingnut 70. Thus, similarly to the FIG. 1 embodiment of the invention, it can be seen that the FIGS. 6 to 8 embodiment incorporates far fewer elements than are generally found in prior art tripod pedestal combinations.

The legs 62, 63 and 64, include support sections 71, 72 and 73, respectively, each of which defines a longitudinal segment of a hollow cone. These sections differ from each other only in that the length of the lower sections 72 and 73 are less than that of the section 71 by a distance equal to the thickness of the sections thereabove. Although this dimensional characteristic is preferable, from the subsequent discussion it will be seen that the adjustable table characteristics incorporated into the tripod structure would compensate for legs having lengths varying from these specific relative dimensions.

The sections 71, 72 and 73 have formed on the upper ends thereof dish-shaped elements 74, 75 and 76, respectively, which elements are adapted to seat in mated relationship as shown in FIG. 8. From the latter figure, it can be seen that the frusto-spherical segments defining the elements 74, 75 and 76 are concentric when in the mated condition. In order to be concentric, the relative radial dimensions of the inner and outer surfaces on the respective elements are proportioned to compensate for the thickness of these elements.

The structure of the elements 74 and 75 is completed by circular openings 77 and 80 formed therethrough, which openings are of the same diameter and are adapted to assume an aligned relationship when the elements are in the seated condition illustrated in FIG. 8. An annular flange 81, having an external diameter slightly less than that of the openings 77 and 80, is turned up on the element 76 and defines an opening 82 therethrough. The flange 81 extends upwardly from the element 76 by a distance slightly less than the thickness of the elements 74 and 75, so as not to interfere with the operation of the table 65, as will be developed subsequently. From FIG. 8 it can be seen that the flange 81 functions to limit universal movement between the elements 74, 75 and 76 and, in effect, defines an axis about which these elements may be pivoted to swing the legs 62, 63 and 64 between the extended and folded conditions illustrated. The difference between the external diameter of the flange 81 and the internal diameters of the openings 77 and 80 is sufficient to accommodate some radial swinging of the legs 62, 63 and 64 relative to the axis of the flange 81 when the legs are assembled as shown in FIG. 8. This difference is selected so that while the elements 74, 75 and 76 are maintained in engagement, the legs 62, 63 and 64 may ride over each other to assume collapsed overlapping engagement.

When operatively assembled, as shown in FIGS. 6 and 8, the table 65 assumes a position universally mounted on the upper surface of the element 74 wherein it functions in cooperation with the retainer member 66 to hold the elements 74, 75 and 76 in seated engagement. Universal mounting of the table 65 is facilitated by a frusto-spherical surface 83 formed thereon and adapted to slidingly mate with the upper surface of the element 74. The table 65 has extending from the upper and lower surfaces thereof threaded studs 84 and 85, respectively. The stud 84 is provided to mount articles, such as cameras, on the table. The stud 85 has a diameter approximately one-fourth of that of the opening 82 and, when in the assembled condition, extends through this opening and through the retainer member 66 and spring 67 into threaded engagement with the nut 70. Concentric openings 86 and 87 in the member 66 define a passage through which the stud 85 passes. The opening 86 has a diameter just slightly greater than that of the stud, whereas the opening 87 has a diameter slightly greater than that of the spring 67 in order that the spring may be seated therein, as shown in FIG. 8. The upper surface of the retainer member 66, designated as 90, is of frusto-spherical configuration and is adapted to mate with the lower surface of the element 76.

When the FIGS. 6 to 8 tripod is in the assembled condition, the legs 62, 63 and 64 may be moved between the extended and collapsed positions simply by loosening the nut 70 to a degree sufficient to permit the legs to freely swing about the axis of the flange 81. Once the legs have been swung to extended position, the operation of the tripod is completed by swiveling the table 65 to the desired position and subsequently tightening the nut 70. It is noted that tightening of the nut functions to lock both the table and the legs at any desired position. The spring 67 functions to maintain some pressure on the retainer member 66 even when the nut 70 has been loosened and, thus, provides for limited frictional resistance between the mating surfaces of the leg elements, table and retainer member. This resistance facilitates controlled adjustment of the table and legs when the nut 70 is loosened.

It is to be understood that the table adaptors illustrated in the FIG. 1 embodiment of the invention might be utilized in the FIGS. 6 to 8 embodiment without departing from the invention. For example, the arm 40 or the converter 50 could be attached to the table 65 in a manner similar to that which they are illustrated as being attached to the table 14. Furthermore, it is also possible that a table similar to 14 and incorporating band securing means could be used in place of the table 65.

To conclude, from the foregoing description it is believed apparent that the present invention enables the accomplishment of the objects initially set forth herein. In particular, an improved tripod of simplified structure and operation is provided which may be manufactured at a minimum of expense. With respect to the manufacture of the tripod, it is noted that the legs, table and retainer member may be readily fabricated from the polycarbon plastics through modern moulding techniques alleviating any necessity for machining. Naturally, it is also possible to manufacture these elements from metal stampings and/or castings. It is, therefore, to be understood that the invention is not intended to be limited to the specific embodiment illustrated and described, but rather is defined by the following claims.

What is claimed is:
1. A collapsible tripod support, comprising:
 (a) three dish-shaped elements disposed one above the other in overlapping engagement, said elements having openings therethrough and mating surfaces of substantially frusto-spherical configuration to provide for universal movement therebetween, the uppermost and lowermost of said elements having, respectively, upper and lower surfaces of substantially frusto-spherical configuration;
 (b) three legs, each of which is fixed to one of said respective elements and extends downwardly therefrom;

(c) a table having a substantially frusto-spherical undersurface mating with the upper surface of the uppermost of said elements for universal movement with respect thereto, said table having article securing means thereon;

(d) a retainer having a substantially frusto-spherical upper surface mating with the lower surface of the lowermost of said elements for universal movement with respect thereto;

(e) means extending loosely through the openings in said elements and into engagement with said table and retainer to selectively pull said table and retainer towards each other to clamp said elements therebetween; and wherein:

(1) said elements and legs cooperate to permit the substantially unrestricted radial swinging of each of said legs through a predetermined arc about the center of said elements to facilitate movement thereof between extended and retracted extremities, and (2) said openings and means extending loosely therethrough are positioned and proportioned relative to each other to avoid interference with the unrestricted radial swinging of said legs through said predetermined arc.

2. A tripod support according to claim 1, wherein:

(a) each said dish-shaped element has a lower boundary defining edge;

(b) the leg fixed to each of said dish-shaped elements extends from a portion of the lower boundary defining edge thereof, and (c) swinging of each leg through said predetermined arc is limited at the extended extremity by abutment of said leg with the boundary defining edge of at least one dish-shaped element disposed in juxtaposition to the dish-shaped element fixed thereto.

3. A tripod support according to claim 1, wherein said retainer has an opening extending therethrough and said means extending loosely through the openings in said elements comprises:

(a) a threaded stud fixed to said table and extending downwardly therefrom through the openings in said elements and the opening in said retainer, and (b) a nut threadedly received on said stud in a position wherein it is adapted to impart compressive force to said retainer.

4. A tripod support according to claim 3, including a resilient member interposed between said retainer and nut, and wherein:

(a) said retainer includes means confining said nut for rectilinear movement with respect thereto and against rotational movement with respect thereto, and (b) said resilient member functions to bias said retainer against the lower of said elements to impart a fractional resistance force between said member and element exceeding the frictional force resisting turning of said nut on said stud.

5. A tripod support according to claim 1, wherein:

(a) said legs comprise longitudinal segments of hollow cones having diverging ends thereof fixed to said elements, and (b) said legs are adapted to nest in overlapping relationship in the collapsed condition.

6. A tripod support according to claim 1, wherein said article securing means comprises:

(a) an arm secured to said table and extending laterally therefrom, said arm having at least one opening therethrough spaced laterally from said table, and (b) a stud extending through said opening, said stud having:

(1) an intermediate section disposed in said opening for free rotation therein;

(2) a threaded section disposed on one side of said arm and adapted to be threadedly received in an article to be supported by said table, and (3) a knob section disposed on the other side of said arm through which rotation may be selectively imparted to said stud.

7. A collapsible support, comprising:

(a) a plurality of elements disposed one above the other in overlapping engagement, said elements having concentric mating surfaces of substantially frusto-spherical configuration to provide for universal movement therebetween;

(b) a plurality of legs, each of which is fixed to one of said respective elements and extends downwardly therefrom;

(c) a table received on the upper exterior surface of the upper of said elements, said table being adapted to support articles thereon;

(d) retainer means mating with the lower of said elements for universal movement with respect thereto; and, (e) means to selectively pull said table and retainer towards each other to clamp said elements therebetween.

8. A collapsible tripod support, comprising:

(a) three dish-shaped elements disposed one above the other in overlapping engagement, said elements having aligned openings therethrough and mating surfaces of substantially frusto-spherical configuration to provide for universal movement therebetween, the uppermost and lowermost of said elements having, respectively, upper and lower surfaces of substantially frusto-spherical configuration;

(b) three legs, each of which is fixed to one of said respective elements and extends downwardly therefrom at an acute angle with respect to the axis of the opening therethrough, said legs being orientated with respect to each other so as to be swingable about said axes between a collapsed condition in overlapping relationship and an extended condition in angularly spaced relationship;

(c) a table having a substantially frusto-spherical undersurface mating with the upper surface of the uppermost of said elements for universal movement with respect thereto, said table being adapted to support articles thereon;

(d) a retainer having a substantially frusto-spherical upper surface mating with the lower surface of the lowermost of said elements for universal movement with respect thereto; and, (e) means extending loosely through the aligned openings in said elements and into engagement with said table and retainer to selectively pull said table and retainer towards each other to clamp said elements therebetween.

9. A tripod support according to claim 8, including an annular member extending through the openings in at least two of said elements to limit universal movement therebetween to a predetermined extent; and wherein said means extends loosely through said annular member.

10. A tripod support according to claim 9, wherein said annular member is fixed to one of said elements and extends loosely through the openings in the other two of said elements.

11. A tripod support according to claim 8, wherein the substantially frusto-spherical surfaces of said elements are concentric.

12. A tripod support according to claim 8, wherein said retainer has an opening extending therethrough and said means comprises:

(a) a threaded stud fixed to said table and extending downwardly therefrom through the openings in said elements and the opening in said retainer; and, (b) a nut threadedly received on said stud below said retainer in a position wherein it is adapted to impart compressive force to said retainer.

13. A tripod support according to claim 12, including a resilient member interposed between said retainer and nut.

14. A tripod support according to claim 8, wherein:
(a) said legs comprise longitudinal segments of hollow cones having diverging ends thereof fixed to said elements; and,
(b) said legs are adapted to nest together in the collapsed condition.

15. A collapsible support, comprising:
(a) a plurality of dish-shaped elements disposed one above the other in overlapping engagement, said elements having mating surfaces of substantially frusto-spherical configuration to provide for universal movement therebetween, the upper and lower of said elements having exterior surfaces of substantially frusto-spherical configuration;
(b) a plurality of legs, each of which is fixed to one of said respective elements and extends downwardly therefrom, said legs being swingable upon relative movement of said elements between a collapsed condition in overlapping relationship and an extended condition in angularly spaced relationship;
(c) a table having a substantially frusto-spherical undersurface mating with the exterior surface of the upper of said elements for universal movement with respect thereto, said table being adapted to support articles thereon;
(d) a retainer haivng a substantially frusto-spherical upper surface mating with the exterior surface of the lower of said elements for universal movement with respect thereto; and,
(e) means to selectively pull said table and retainer towards each other to clamp said elements therebetween.

References Cited by the Examiner
UNITED STATES PATENTS

| | | | |
|---|---|---|---|
| 630,220 | 8/1899 | Hayes | 248—188 X |
| 812,233 | 2/1906 | Rock | 248—187 |
| 911,544 | 2/1909 | Roehlk | 248—187 |
| 2,188,237 | 1/1940 | Weaver | 248—168 |
| 2,689,995 | 9/1954 | Smith | 248—231 X |
| 3,059,250 | 10/1962 | Mayer | 248—231 X |

CLAUDE A. LE ROY, *Primary Examiner.*

JOHN PETO, *Examiner.*